(12) United States Patent
Tanada et al.

(10) Patent No.: US 7,659,892 B2
(45) Date of Patent: Feb. 9, 2010

(54) DISPLAY DEVICE AND PORTABLE TERMINAL

(75) Inventors: Yoshifumi Tanada, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 284 days.

(21) Appl. No.: 11/374,431

(22) Filed: Mar. 14, 2006

(65) Prior Publication Data

US 2006/0209060 A1    Sep. 21, 2006

(30) Foreign Application Priority Data

Mar. 17, 2005    (JP) .............................. 2005-078191

(51) Int. Cl.
  G06F 3/038    (2006.01)
  G09G 5/00    (2006.01)
  H02J 7/00    (2006.01)

(52) U.S. Cl. ...................... 345/211; 345/212; 320/127

(58) Field of Classification Search ................. 363/204, 363/206, 211, 213; 345/13, 15, 74, 78, 95, 345/211

See application file for complete search history.

(56) References Cited

U.S. PATENT DOCUMENTS

| | | | | |
|---|---|---|---|---|
| 5,384,513 A | * | 1/1995 | Ji ................................ | 313/442 |
| 5,384,516 A | * | 1/1995 | Kawabata et al. ........... | 315/160 |
| 6,124,839 A | * | 9/2000 | Usui ............................ | 345/94 |
| 6,321,067 B1 | | 11/2001 | Suga et al. | |
| 2002/0036621 A1 | * | 3/2002 | Liu et al. ..................... | 345/173 |
| 2002/0130675 A1 | | 9/2002 | Hiroki | |
| 2002/0132383 A1 | | 9/2002 | Hiroki et al. | |
| 2003/0001833 A1 | * | 1/2003 | Hunter ....................... | 345/212 |
| 2005/0009252 A1 | * | 1/2005 | Yamazaki et al. ........... | 438/151 |
| 2005/0062705 A1 | * | 3/2005 | Yamada ....................... | 345/94 |
| 2005/0104068 A1 | * | 5/2005 | Yamazaki .................... | 257/66 |

FOREIGN PATENT DOCUMENTS

| | | | | |
|---|---|---|---|---|
| JP | | 62-043238 | | 11/1979 |
| JP | | 62-043238 | | 9/1987 |
| JP | | 01163689 A | * | 6/1989 |
| JP | | 06-133476 | | 5/1994 |
| WO | WO 2005-098745 | | | 10/2005 |

* cited by examiner

*Primary Examiner*—Edward Tso
*Assistant Examiner*—Johali A Torres Ruiz
(74) *Attorney, Agent, or Firm*—Eric J. Robinson; Robinson Intellectual Property Law Offices, P.C.

(57) ABSTRACT

In order to increase the continuous operating time of a display device driven by a battery or the like, and a portable information terminal using the same, the volume and weight of the battery are increased. Thus, there arises a trade-off between the increased capacity of the battery and the portability of the device/terminal. Therefore, the invention provides a display device with portability ensured, which is capable of operating continuously for long periods and a portable information terminal using the same. In the display device, TFTs and an RFID tag are formed over the same insulating substrate. The RFID tag detects signals from a reader/writer, and generates DC power based on the signals. While the RFID tag is detecting signals, the display device is driven by the DC power generated in the RFID tag.

9 Claims, 5 Drawing Sheets

DISPLAY DEVICE AND PORTABLE TERMINAL

BACKGROUND OF THE INVENTION

1. Field of the Invention

The present invention relates to a display device and a portable terminal. In particular, the invention relates to a portable terminal having a display device in which images are displayed by controlling multiple pixels arranged in matrix. More particularly, the invention relates to a portable terminal having a flat-panel display device in which images are displayed by using multiple thin film transistors provided over an insulating substrate.

2. Description of the Related Art

In recent years, RFID (Radio Frequency IDentification) tags have been researched and developed as a new technology for goods identification and management in the distribution industry as an alternative to conventional barcodes, and also examined as a new personal identification means. Further, it is drawing attentions as a fundamental technology for advancing IT and automation of the infrastructure (cf. Japanese Patent Publication No. Sho62-43238). RFID tags are also called RF chips, RF tags, IC (Integrated Circuit) chips, IC tags, wireless chips, wireless tags, electronic chips, electronic tags, wireless processors, wireless memories and the like.

RFID tags have various advantages in that wireless communication with a reader/writer is enabled by providing an antenna in an IC chip used as the tag, and multiple objects can be concurrently identified unlike a barcode as a typical conventional identification means that requires objects to be directly read out with a scanning barcode reader one by one.

Further, there is an RFID tag that has no internal power source but has an antenna portion for detecting electromagnetic waves transmitted from a reader/writer, based on which direct current (hereinafter referred to as DC) power is generated to operate the RFID tag.

Portable terminals such as a portable phone or a PDA (Personal Digital Assistant) are required to be further reduced in weight and size for improving the convenience. Therefore, each component of the portable terminals is required to be further reduced in volume. For a display device to be an interface portion, a flat panel display is mainly adopted where circuits are configured with multiple thin film transistors (TFTs) provided over an insulating substrate formed of glass, plastic or the like.

Further, in accordance with the improved performance of portable terminals per se, possibility of users carrying the portable terminals has been expanding, and thus a longer continuous operating time is required as compared to the conventional ones.

In order to increase the continuous operating time of portable terminals, each component of the portable terminals is required to be reduced in power consumption, and a battery is required to be increased in capacity. In order to achieve the former requirement for the longer continuous operating time, various measures have already been taken such as lowering the driving voltage or controlling the portable terminals to enter a standby mode often by software control with an aim to reduce power consumption. However, as for the later requirement for the increased capacity of the battery, the volume of the battery is increased if the capacity of the battery is increased; therefore, there arises a trade-off between the increased capacity of the battery and the aforementioned reduction in size and weight.

SUMMARY OF THE INVENTION

In view of the foregoing problems, it is an object of the invention to provide a portable terminal with an increased continuous operating time. It is another object of the invention to provide a portable terminal with an improved continuous operating time along with reduction in size and weight.

In the invention, functional units of an RFID are formed by using TFTs over the same insulating substrate as, and concurrently with a step of forming TFTs that constitute a driver circuit of a display device. Here, the TFTs for constructing the display device and the TFTs for constructing the RFID tag may have basically the same structures, and thus manufacturing steps thereof can be simplified.

When the RFID tag that is incorporated in the display device is put close to a reader/writer, an antenna in the RFID tag detects signals from the reader/writer. Then, a power source circuit included in the functional unit of the RFID tag generates DC power based on the signals detected from the reader/writer. The generated DC power is used for driving the display device.

Power supply to the display device may be carried out by any of the following methods: a method for supplying power from a home power source or the like through an AC (Alternating Current) adapter or the like; a method for supplying power from a built-in battery; a method for supplying power that is generated by the RFID tag; or the like. When the RFID is activated by detecting signals from the reader/writer, the RFID tag generates a signal for switching a power source, thereby power supply to the display device is switched from the AC adapter or the battery to the power source circuit in the RFID tag. When the RFID tag is moved away from a region where the RFID can detect signals from the reader/writer, the power supply is switched again from the internal power source circuit to the AC adapter or the battery.

Note that switching of the power supply as for the case of supplying power from a home power source or the like through an AC adapter or the like, and the case of supplying power from a built-in battery has already been carried out in many portable terminals; therefore, the method is not described here. Thus, the switching may be carried out appropriately in accordance with the conventional method.

A portable terminal of the invention includes a resonant circuit having a coil and a capacitor connected in parallel, a power source circuit for generating DC power by rectifying AC power that is induced by bringing the resonant circuit into a resonant state. Thus, the DC power generated in the power source circuit is used for driving the portable terminal.

A display device of the invention displays images by controlling multiple pixels arranged in matrix. The display device includes a resonant circuit having a coil and a capacitor connected in parallel, a power source circuit for generating DC power by rectifying AC power that is induced by bringing the resonant circuit into a resonant state. The DC power generated in the power source circuit is used for driving a part of or the entire circuits that constitute the display device.

A portable terminal of the invention includes a display device in which images are displayed by controlling multiple pixels arranged in matrix, and a battery for supplying a first DC power. The display device includes a resonant circuit having a coil and a capacitor connected in parallel, and a power source circuit for generating a second DC power by rectifying AC power that is induced by bringing the resonant circuit into a resonant state. The first DC power or the second DC power is used for driving a part of or the entire circuits that constitute the display device.

In the portable terminal of the invention with the aforementioned configuration, the display device further includes a selector circuit for selecting the first DC power or the second DC power. The selector circuit selects the first DC power when the resonant circuit is not in the resonant state whereas it selects the second DC power when the resonant circuit is in the resonant state.

In the invention, the display device further includes a source driver and a gate driver for controlling the multiple pixels.

In the invention, the multiple pixels, the resonant circuit and the power source circuit are formed over the same insulating substrate.

In the invention, the multiple pixels, the resonant circuit, the power source circuit and the selector circuit are formed over the same insulating substrate.

In the invention, the multiple pixels, the resonant circuit, the power source circuit, the selector circuit, the source driver and the gate driver are formed over the same insulating substrate.

In the invention, the multiple pixels and the power source circuit include thin film transistors provided over an insulating substrate formed of glass or plastic.

In the invention, the multiple pixels, the power source circuit and the selector circuit include thin film transistors provided over an insulating substrate formed of glass or plastic.

In the invention, the multiple pixels, the power source circuit, the selector circuit, the source driver and the gate driver include thin film transistors provided over an insulating substrate formed of glass or plastic.

In the invention, each of the multiple pixels includes a liquid crystal element or a self-luminous element.

Conventionally, portable terminals have been operated by using only a battery with limited capacity when the terminals are carried about. However, in the invention, power supply at an arbitrary place can be enabled within such a range that signals from a reader/writer of an RFID tag can be detected, thereby the operating time of the portable terminals can be increased.

In addition, the main feature of the invention is the power supply to the display device, switching operation of the power supply and the like. That is, unlike a general RFID tag that communicates signals with only registered readers/writers, the invention enables signals outputted from unspecified readers/writers to be detected by the RFID tag, based on which the RFID can generate power. Thus, the RFID tag of the invention can be used in various institutions. Needless to say, identification of the terminal or the like can be carried out in parallel with the function described in this specification.

Further, by forming the pixel portion for displaying images and the RFID tag over the same substrate, the number of components can be reduced, thereby the portable terminal can be reduced in size and weight.

DETAILED DESCRIPTION OF THE INVENTION

Figure 1:
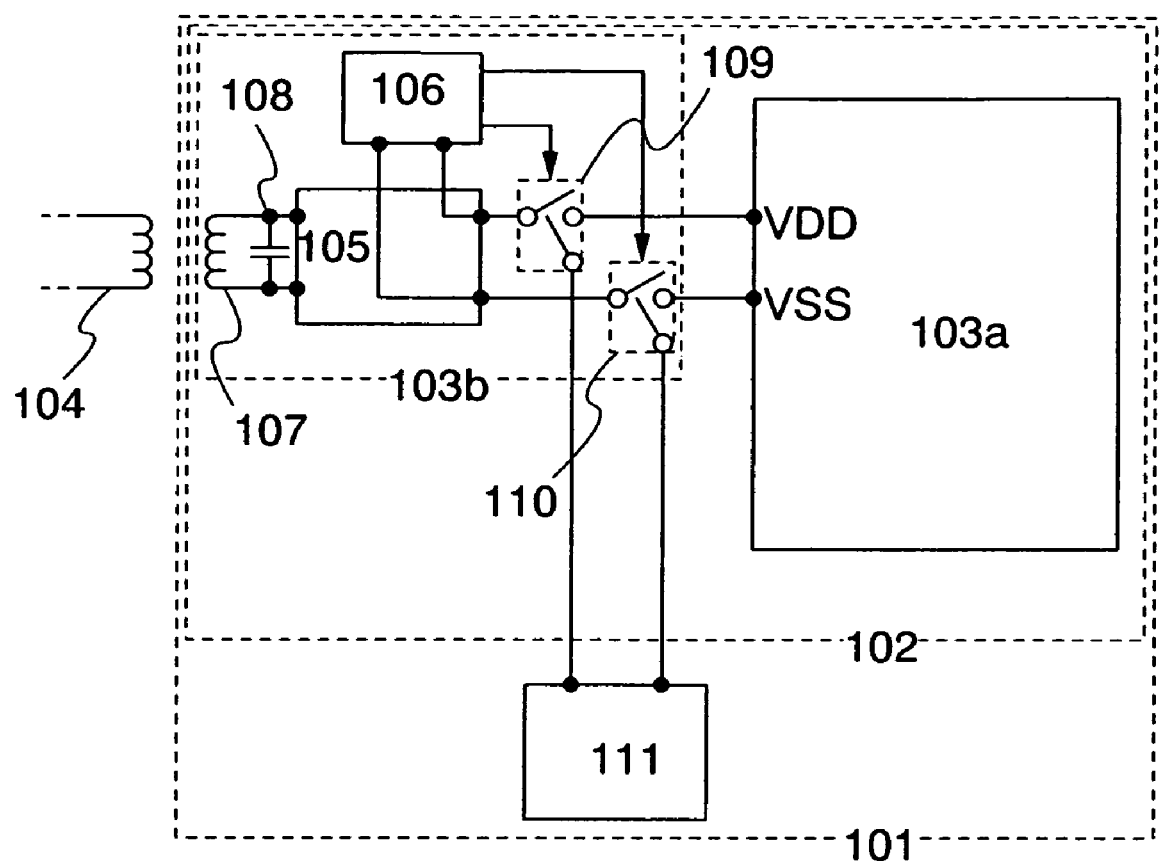
FIG. 1 illustrates one embodiment mode of the invention.

Description is made with reference to FIG. 1 on one embodiment mode of the invention. A portable terminal 101 has a display device 102 and a battery 111 as main components. The display device 102 has a display portion 103a and an RFID tag 103b. The RFID tag 103b has a power source circuit 105, a functional unit 106 (including a selector circuit), and an antenna constructed of a resonant circuit that includes a coil 107 and a capacitor 108 connected in parallel. Here, the functional unit 106 includes a memory in which identification data is stored, a logic circuit for performing arithmetic operation such as generation of signals to be outputted to an antenna of a reader/writer, and the like. In addition, the display device includes switches 109 and 110 for selecting one of the power source circuit 105 or the battery 111 to supply power sources VDD and VSS (potential values are not specified; VSS is a ground potential, for example) for driving the display portion 103a. The switches 109 and 110 are controlled by the selector circuit included in the functional unit 106. Each of the switches 109 and 110 selects one of the power source circuit 105 or the battery 111 to supply the power sources VDD and VSS for driving the display portion 103a. Reference numeral 104 is an antenna provided at a reader/writer side.

Although the configuration of the switches 109 and 110 is not specifically limited, each of the switches herein has two input terminals, an output terminal and a control terminal, and a signal from the selector circuit included in the functional unit 106 is inputted to the control terminal to select one of the two input terminals, thereby the selected input terminal is short-circuited to the output terminal.

Figure 2A:
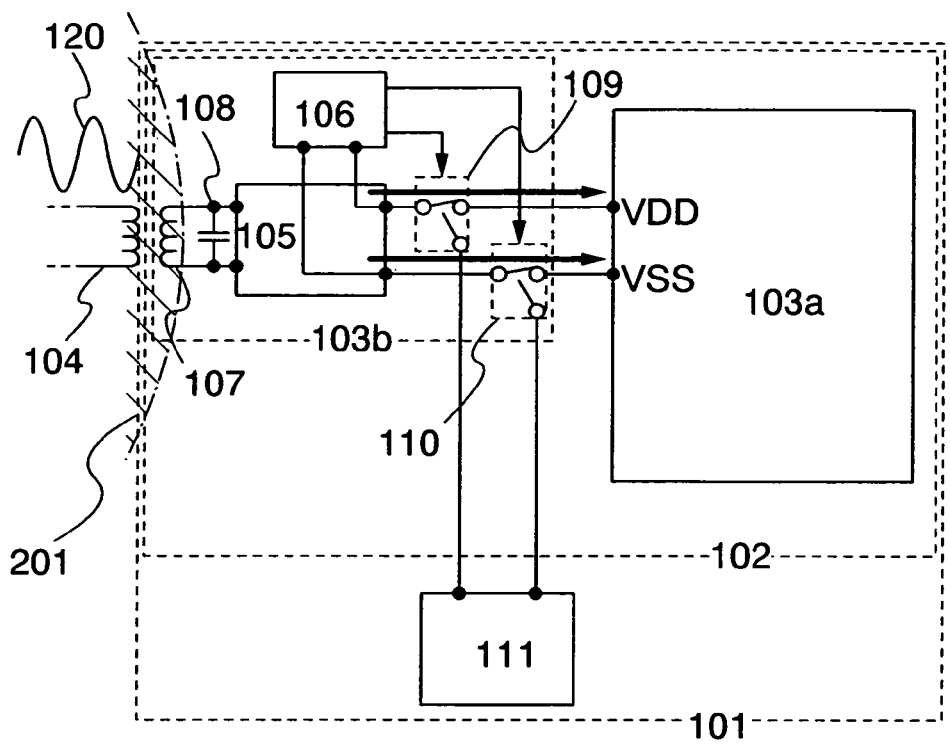
FIGS. 2A and 2B illustrate one embodiment mode of the invention.

When the display device 102 having the RFID tag 103b enters a region 201 where a signal 120 from the antenna 104 of the reader/writer side can be detected (which corresponds to a region shown by the slant bars in FIG. 2A), the parallel resonant circuit in which the coil 107 and the capacitor 108 are connected in parallel is brought into a resonant state, thereby AC power is induced between opposite ends of the parallel resonant circuit, namely opposite terminals by which the coil 107 and the capacitor 108 are connected in parallel. The power source circuit 105 having a rectifier circuit, a capacitor and the like converts the AC power induced in the resonant circuit into DC power.

Subsequently, the functional unit 106 of the RFID tag is driven based on the DC power generated in the power source circuit 105. The selector circuit included in the functional unit 106 controls the switches 109 and 110 to supply the generated DC power to the display portion 103a. The aforementioned state is maintained to continuously generate DC power as long as the parallel resonant circuit is in the resonant state, thereby the generated DC power is used for driving the display device 102.

Figure 2B:
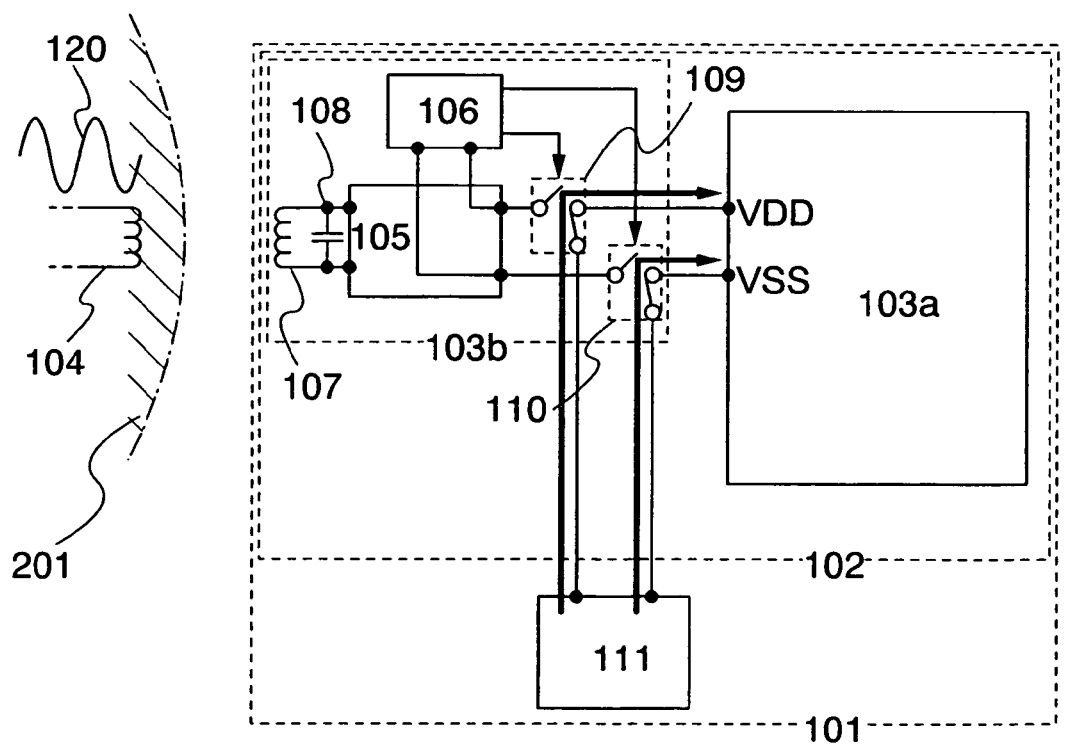

After that, when the display device 102 having the RFID tag 103b gets out of the region 201 where the signal 120 from the antenna 104 of the reader/writer side can be detected (which corresponds to a region shown by the slant bars in FIG. 2B), the parallel resonant circuit stops the resonant oscillation, thereby the power source circuit 105 and the functional unit 106 stop their operations. At this time, the control terminals of the switches 109 and 110, which have been controlled by the selector circuit included in the functional unit 106, can be brought into a floating state. When the RFID tag 103b stops its function, power is required to be supplied from the battery 111. As a favorable example, it is preferable to provide such a configuration that when the RFID tag 103b stops its function, the control terminals of the switches 109 and 110, namely output terminals of the selector circuit included in the functional unit 106 are fixed at VSS. Specifically, there is such a method that a resistor with high resistance is interposed between the output terminals of the selector circuit included in the functional unit 106 and VSS. Alternatively, there is such a method that VDD used in the functional unit 106 is set to have the same potential as VSS when the power supply from the power source circuit 105 is stopped, or the like. For example, when the functional unit 106 is in operation, the output terminals of the selector circuit output signals for controlling the switches 109 and 110, whereas when the functional unit 106 stops its operation and the output terminals of the selector circuit are brought into a floating state, the potentials of the output terminals of the selector circuit included in the functional unit 106 are fixed at VSS by the aforementioned configuration. When such a state is obtained, it is only necessary that power be supplied to the display portion 103a from the battery 111.

Although the battery 111 is taken as an example of a second power supply source in addition to the DC power generated by the RFID tag 103b as a first power supply source in the invention, only the first power supply source may be used for driving the display device 102. In such a case, the selector circuit included in the functional unit 106 is not required, and the portable terminal can be used only in the region where signals from the antenna 104 of the reader/writer side can be detected.

Note that the power source circuit 105 included in the RFID tag 103b generates power by detecting signals from the reader/writer, and this power is preferably large enough to drive the display device 102. In general, it is considered that in an RFID tag that uses a frequency band of 13.56 MHz, a power source circuit is required to output power with about several microwaves to several tens of microwaves for driving a functional unit provided in the RFID tag. Accordingly, in view of the characteristic variations of TFTs, conversion efficiency or the like, it is preferable to use as the display device 102, a light-reflective liquid crystal display device with relatively small total power consumption.

Meanwhile, in the case of using as the display device 102, a light-transmissive liquid crystal display device, a self-luminous display device using EL (ElectroLuminescence) elements or the like, for example, the backlight and the EL elements consume relatively big power. Accordingly, such a configuration may be employed that the power generated by the aforementioned method is used for driving only a driver portion of the display device 102 while a fixed power or a battery is constantly used for supplying power to the backlight or the EL elements. In such a case, another power supply path that is not via the switches 109 and 110 is required.

Although this embodiment illustrates one mode of the invention where a battery is used as a second power supply for driving the display device, by taking into account that the power source circuit provided in the RFID tag is not capable of generating very big power, a similar technique can be applied to the drive of the other components that constitute the portable terminal.

Embodiment 1

Figure 3:
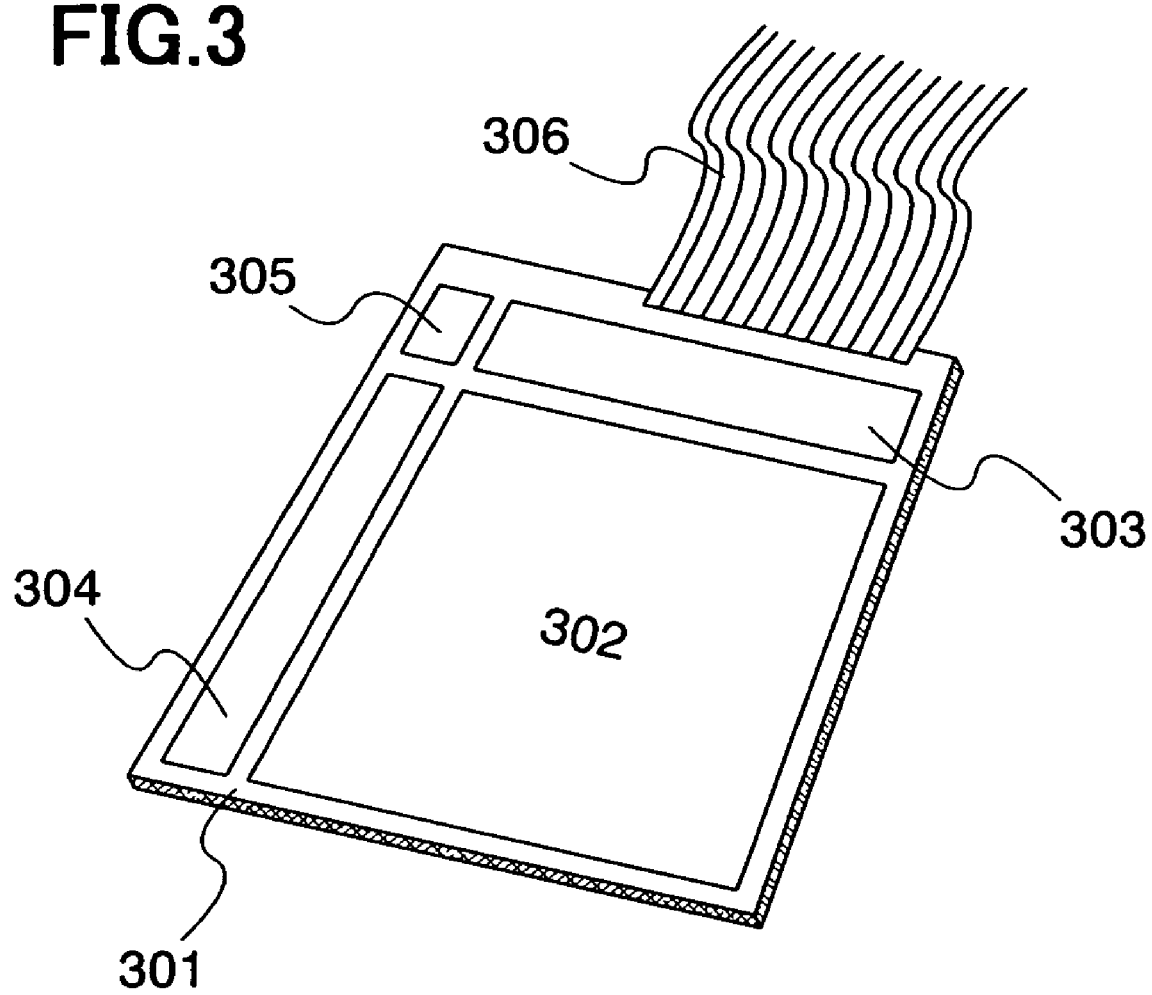
FIG. 3 illustrates one embodiment of the invention.

Description is made with reference to FIG. 3 on a detailed structure of a display device included in a portable terminal of the invention. The display device is provided with a pixel portion 302 where pixels each including a TFT and a display element such as a liquid crystal element or an EL element are arranged in matrix over an insulating substrate 301 formed of plastic or the like. On the periphery of the pixel portion 302, a source driver 303 and a gate driver 304 are provided to drive each pixel in the pixel portion 302. The pixel portion 302, the source driver 303 and the gate driver 304 belong to the display portion 103a in FIG. 1. Meanwhile, since an RFID tag 305 has higher flexibility in circuit designs and shapes as compared to the pixel portion 302, the source driver 303 and the gate driver 304, it may be provided in the margin of the substrate 301 that is left after disposing the aforementioned circuits. Signal input/output to/from these circuits and power supply from an external power source such as a battery may be carried out through a flexible printed circuit (FPC) 306.

In addition, though not shown in FIG. 3, a counter substrate is attached onto the insulating substrate 301 for sealing the liquid crystal elements or the EL elements. The counter substrate is required to be selected in accordance with the elements that constitute the display portion: if light is required to be extracted from the counter substrate side, the counter substrate has to be a light-transmissive substrate, whereas if light is not extracted from the counter substrate side, for example, in the case of using EL elements of a bottom-emission type in particular, the counter substrate may be replaced by a metal sealing can.

Figure 4A:
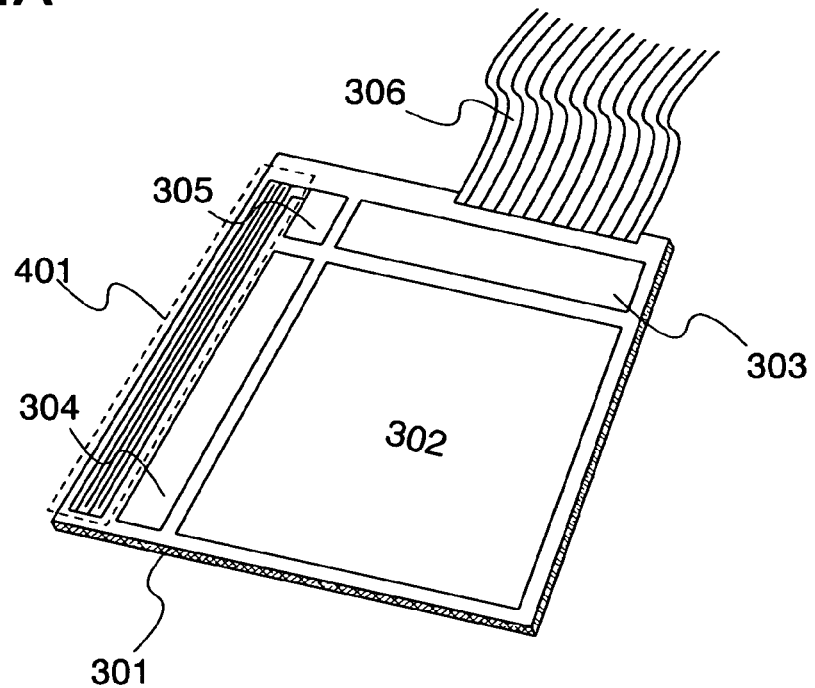
FIGS. 4A and 4B illustrate one embodiment of the invention.
Figure 4B:
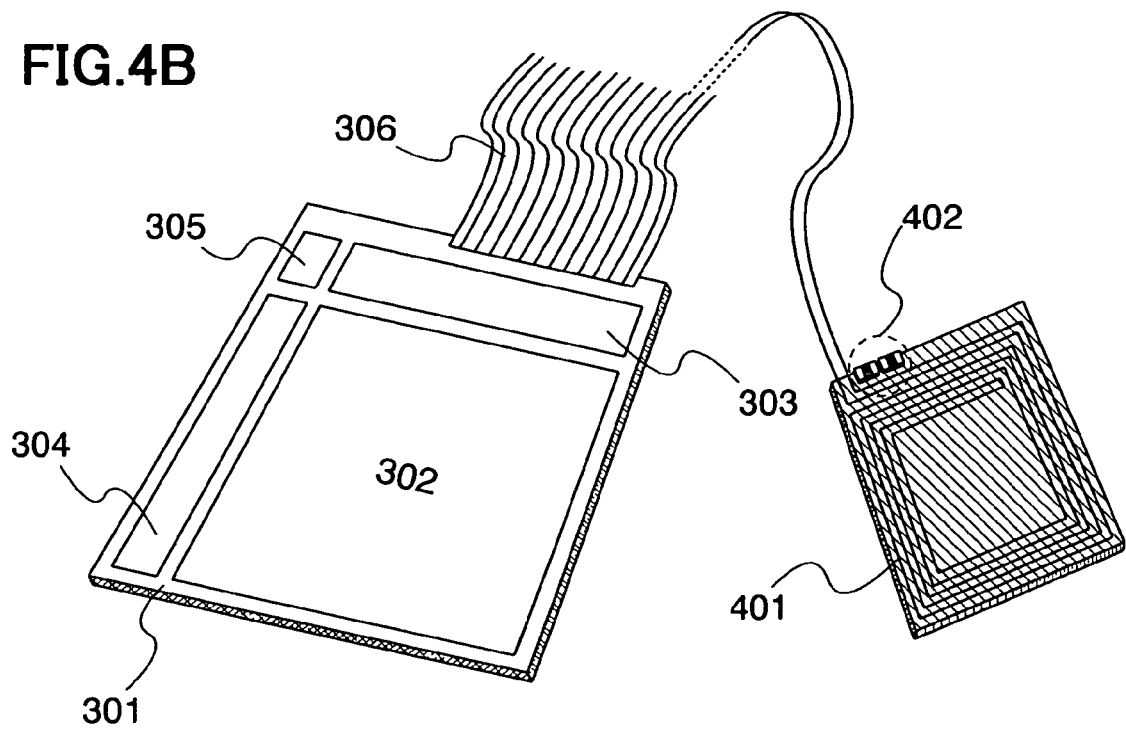

In addition, as for a coil and a capacitor for constructing an antenna of the RFID tag, a coil 401 and a capacitor (not shown) may be formed over the same insulating substrate 301 as, and concurrently with the pixel portion 302, the source driver 303, the gate driver 304 and the RFID tag 305 as shown in FIG. 4A. Note that the size of the coil and the capacitor differs depending on the resonance frequency. Further, in the case of constructing the capacitor by forming a thin film over the insulating substrate, quite a large area is required for obtaining high capacity. This requirement of areas is the same in the formation of a coiled wire. Therefore, in the case where an increase in the substrate area becomes a problem due to the incorporated antenna (specifically, in the case where a housing of an electronic appliance to which the display device of the invention is applied is small and a reduction in frame size is required, for example), the coil 401, a capacitor 402 and the like may be mounted on another substrate as shown in FIG. 4B so that they are connected to the RFID tag 305 through the FPC 306.

Embodiment 2

Figure 5A:
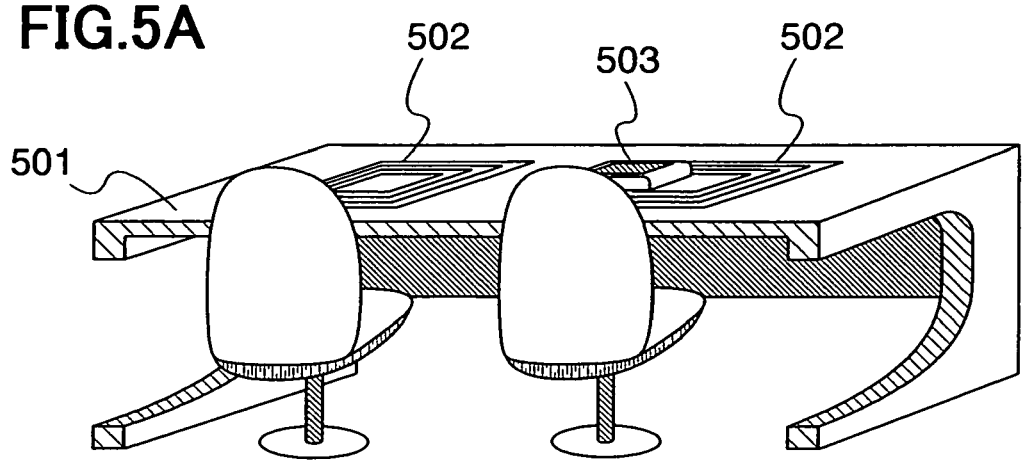
FIGS. 5A to 5C illustrate one embodiment of the invention.
Figure 5B:
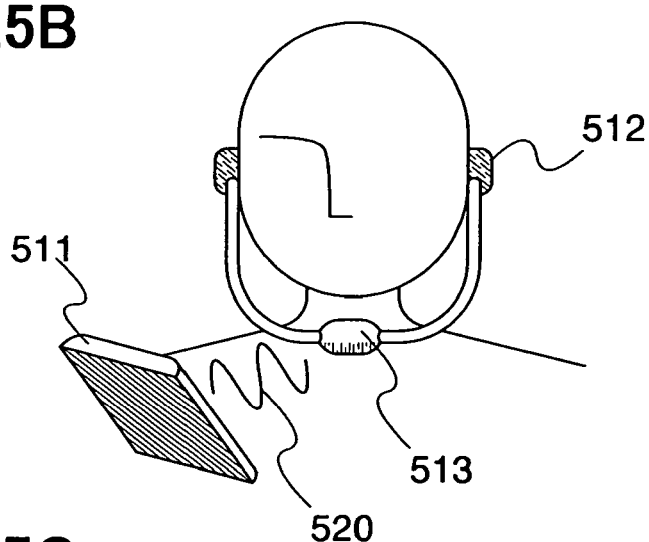
Figure 5C:
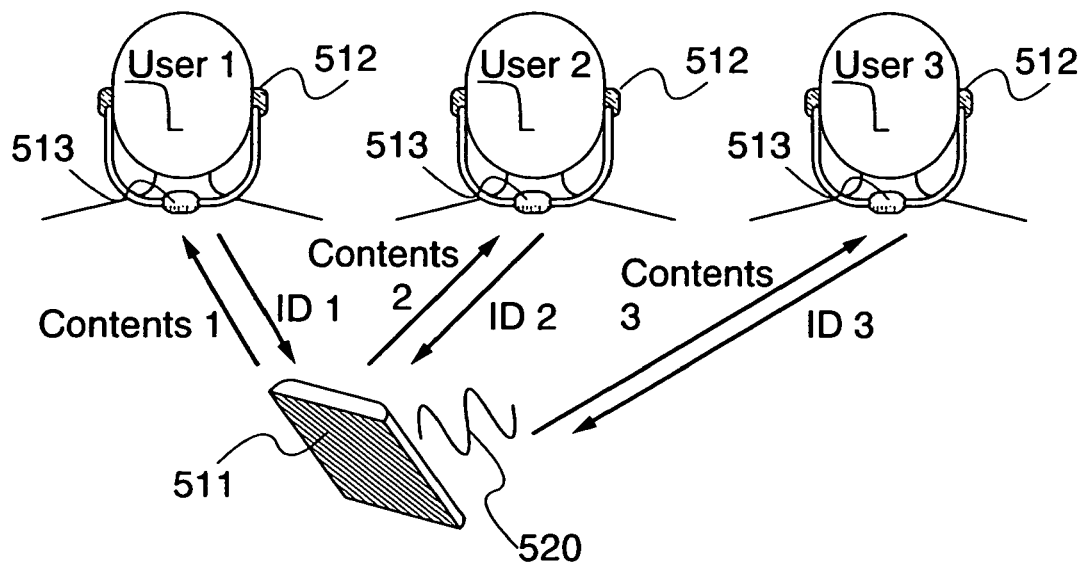

Description is made with reference to FIGS. 5A to 5C on applications of the invention. Antennas 502 of readers/writers are built in a table 501, for example inside a top board of a table 501 set in the general institution. When a user puts a portable terminal 503 on the table, an antenna in the portable terminal 503 detects signals outputted from the antenna 502 of the reader/writer on the table 501, thereby a power source circuit in the portable terminal 503 is activated. While the user is using the portable terminal 503 while setting on the chair, a display device in the portable terminal 503 can be driven by the DC power generated by the power source circuit in the portable terminal 503.

Note that when assuming the aforementioned use environment, such application can be enabled in using a portable terminal at an office for example, that the personal identification is carried out by using an identification function as the primary function of the RFID tag, concurrently with the power supply as described above. Identification data includes various data such as the control data for access permission to computer disks at an office, for example, when a user connects his/her portable terminal to a LAN or the like.

Meanwhile, when assuming applications of RFID tags to electronic books, image viewers, music players or the like, it is necessary that a function of a reader/writer be provided in a portable terminal 511 such as an electrical book, an image viewer or a music player, while an RFID tag 513 be incorporated in a receiver 512. As long as the receiver 512 is in the condition capable of detecting a signal 520 from an antenna of the reader/writer that is provided in the portable terminal 511 such as an electrical book, an image viewer or a music player, power for driving the receiver 512 can be generated in the RFID tag 513 by a similar method of the invention.

Further, in the case where multiple users have their respective receivers 512, and data stored in one portable terminal 511 such as an electrical book, an image viewer or a music player is to be reproduced as shown in FIG 5C, such a configuration may be constructed that individual identification numbers are assigned to the RFID tags 513 provided in the respective receivers 512, so that at the time when each ID number is read out by the reader/writer of the portable terminal 511 such as an electrical book, an image viewer or a music player, a play list set by each user is read out, and the reading order of data is changed in accordance with the play list. Each user can use a preferred content at his/her disposal from one portable terminal 511 such as an electrical book, an image viewer or a music player.

Note that the RFID tag used in the invention is not limited to a certain type, particularly with respect to the standards of frequency band. There are various standards for the frequency band such as a low frequency (125 KHz etc.), high frequency (13.56 MHz etc.), ultra-high frequency (about 900 MHz etc.) and microwave (2.45 GHz etc.). The intrinsic effect of the invention will not changed by applying the invention to any of the aforementioned frequency bands. Since each frequency band has merits and demerits in the commercial field, communication distance, directivity and the like, the frequency band may be selected for each application.

The present application is based on Japanese Priority application No. 2005-078191 filed on Mar. 17, 2005 with the Japanese Patent Office, the entire contents of which are hereby incorporated by reference.

What is claimed is:

1. A portable terminal comprising:
a battery for supplying a first DC power for driving a part of or the entire circuits;
a resonant circuit comprising a coil and a capacitor for inducing AC power by bringing the resonant circuit into a resonant state, the coil and the capacitor being connected in parallel;
a power source circuit for generating a second DC power for driving a part of or the entire circuits by rectifying the AC power; and
a selector circuit for selecting the first DC power or the second DC power,
wherein the selector circuit selects the first DC power when the resonant circuit is not in the resonant state and selects the second DC power when the resonant circuit is in the resonant state.

2. The portable terminal according to claim 1, further comprising a display portion.

3. A portable terminal comprising:
a display device for displaying images by controlling multiple pixels arranged in matrix comprising a resonant circuit and a selector circuit; and
a battery for supplying a first DC power for driving a part of or the entire circuits
wherein the selector circuit selects the first DC power when the resonant circuit is not in a resonant state and selects a second DC power when the resonant circuit is in the resonant state, and
wherein the resonant circuit comprises:
a coil and a capacitor for inducing AC power by bringing the resonant circuit into the resonant state, the coil and the capacitor being connected in parallel, and
a power source circuit for generating the second DC power for driving a part of or the entire circuits by rectifying the AC power.

4. The portable terminal according to claim 3, wherein the multiple pixels, the resonant circuit, the power source circuit and the selector circuit are formed over the same insulating substrate.

5. The portable terminal according to claim 3, wherein the multiple pixels, the power source circuit and the selector circuit comprise thin film transistors, and are provided over an insulating substrate formed of glass or plastic.

6. The portable terminal according to claim 3, wherein each of the multiple pixels comprises a liquid crystal element or a self-luminous element.

7. The portable terminal according to claim 3, wherein the display device further comprises a source driver and a gate driver for controlling the multiple pixels.

8. The portable terminal according to claim 7, wherein the multiple pixels, the resonant circuit, the power source circuit, the selector circuit, the source driver and the gate driver are formed over the same insulating substrate.

9. The portable terminal according to claim 7, wherein the multiple pixels, the power source circuit, the selector circuit, the source driver and the gate driver comprise thin film transistors, and are provided over an insulating substrate formed of glass or plastic.

* * * * *